United States Patent [19]

Skelton et al.

[11] Patent Number: 5,358,758
[45] Date of Patent: Oct. 25, 1994

[54] STRUCTURAL MEMBER

[75] Inventors: John Skelton, Sharon; David S. Brookstein, Wellesley, both of Mass.

[73] Assignee: Albany International Corp., Albany, N.Y.

[21] Appl. No.: 825,389

[22] Filed: Jan. 24, 1992

Related U.S. Application Data

[63] Continuation-in-part of Ser. No. 447,096, Dec. 6, 1989, abandoned.

[51] Int. Cl.$^5$ .............................................. B32B 3/00
[52] U.S. Cl. ...................................... 428/53; 428/54; 428/57; 428/58; 428/73
[58] Field of Search ................. 428/224, 53, 54, 57, 428/58, 73

[56] References Cited

FOREIGN PATENT DOCUMENTS 0286004 12/1988 European Pat. Off. ...... D03D 1/00

Primary Examiner—Patrick J. Ryan
Assistant Examiner—Richard C. Weisberger
Attorney, Agent, or Firm—Kane, Dalsimer, Sullivan, Kurucz, Levy, Eisele & Richard

[57] ABSTRACT

A structural member formed from a plurality of layers of interwoven fibrous material. The plurality of layers intersect and join each other along lines of contact. The lines of contact form axes of the member. A hollow central portion having a perimeter is defined by the plurality of intersecting layers and the lines of contact. A plurality of points are formed on the perimeter of the hollow central portion defined by the lines of contact formed by the axes. At least one flange extends outwardly of the hollow central portion at each of the points, wherein each of the plurality of layers extends beyond the axes of the member to define the flanges.

19 Claims, 7 Drawing Sheets

FINAL PREFORM BEFORE MOLDING.

Interlocked fabrics at 0/90 degrees.

Laid in fabric at +45/-45 degrees.

FIG. 2 WEAVE PATTERN m repeats determines width of gussets
n repeats determines width of core
a,b : interlocking zone

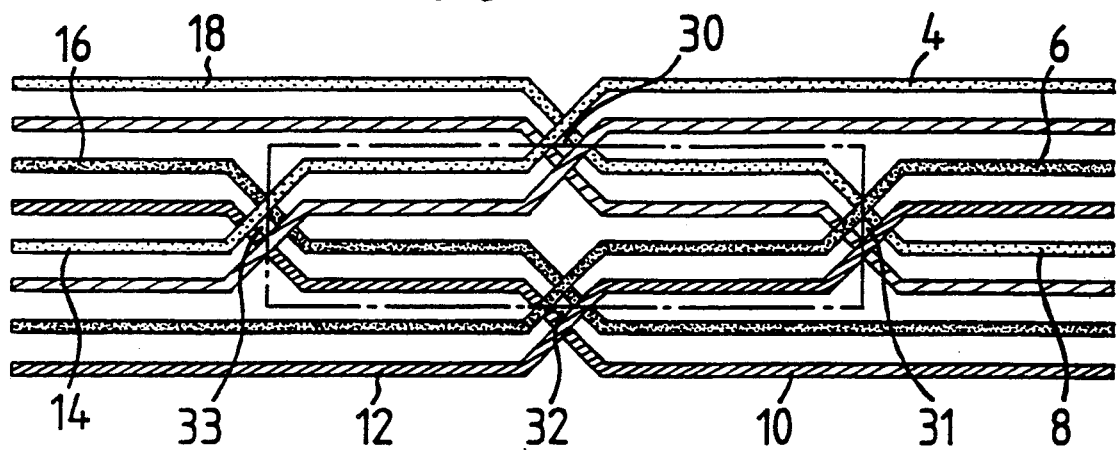
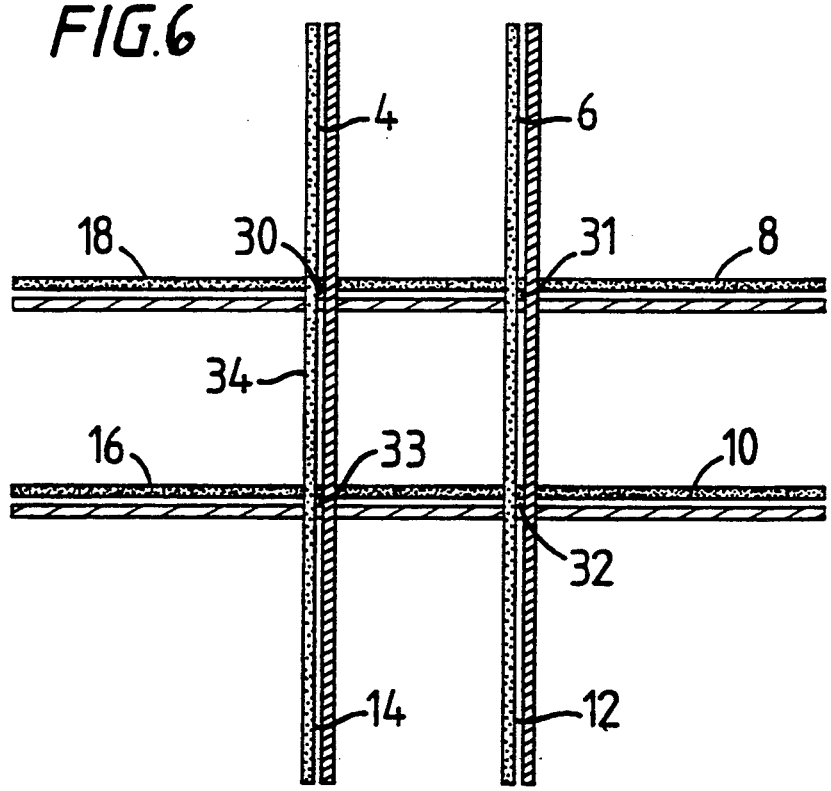
Eight layers of interlocked fabric opened and ready for molding.

FIG. 8  FINAL PREFORM BEFORE MOLDING.
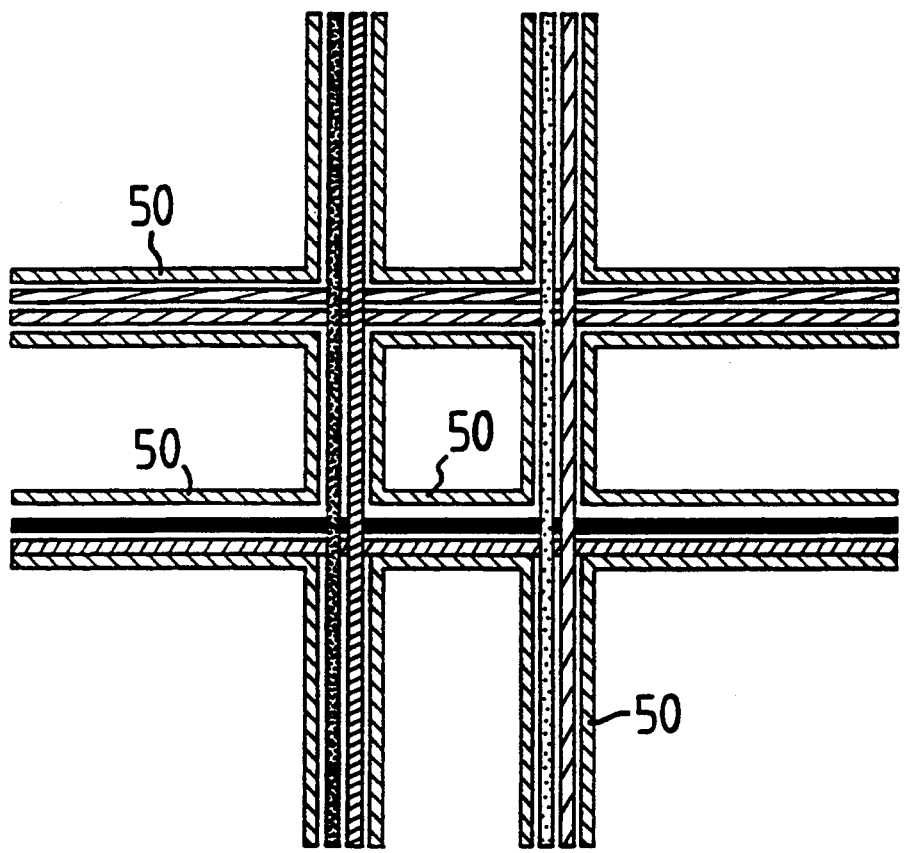
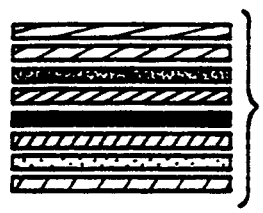 } Interlocked fabrics at 0/90 degrees.
 Laid in fabric at +45/−45 degrees.

STRUCTURAL MEMBER

This is continuation-in-part of application Ser. No. 07/477,096 filed Dec. 6, 1989, now abandoned.

BACKGROUND OF THE INVENTION

1. Field of the Invention

This invention relates to a structural member and has particular reference to beam supports and the like.

2. Description of the Prior Art

Hitherto, beam supports, brackets and hangers have been made of metals such as iron or steel. There are heavy and also suffer from problems of corrosion. It is desirable in many cases to replace, where possible, a proportion of such metal components, particularly in vehicles, with plastics materials to save weight and hence, for example, fuel. A further advantage, apart from saving fuel, is that plastics materials do not suffer problems of corrosion which metals do. Plastics materials per se however are not suitable for replacing all the elements of vehicles, particularly the structural and weight bearing elements, since they do not necessarily possess the required strength and material properties of metals.

SUMMARY OF THE INVENTION

It is an object of the present invention to alleviate some or all of the above-mentioned disadvantages of existing structural members.

a first aspect of the present invention there is provided a structural member formed from layers of a fibrous material, and comprising a hollow portion having flanges extending outwardly therefrom characterised in that the layers of material are joined along lines of contact which define axes of the member, wherein (i) the layers of material are interwoven to intersect each other at each line of contact;

(ii) the joined layers are rearranged in three dimensions to define the hollow portion in a central portion of the structural member, a portion of each layer being bent about the axes of the member to define the flanges extending outwardly of the hollow portion; and (iii) the joined lines of contact of the layers each define a point or a corner on the perimeter of a section of the hollow portion.

In a further aspect of the invention there is provided a structural member formed from layers of a woven fibrous material, in which member the layers of material are interwoven to intersect each other along axes of the member defining lines of intersection of the layers. The layers are rearranged in three dimensions to define a series of spaced hollow portions. Each line of intersection of the layers defines a point or corner on the perimeter of one of the said hollow portions. A portion of each layer exterior to the outer parts of one of the hollow portions serves to define a part of the structure selected from flanges spaced thereabout and an element of the next adjacent hollow portion, whereby filaments of each flange are continuous and interwoven with at least one of the hollow portions.

Another aspect of the invention includes a structural member having a hollow portion and one or more flanges extending therefrom formed from layers of filaments of a fibrous material. The filaments are filled or coated with a plastics or resinous material wherein the structural member is made by a method comprising the steps of:

forming an interwoven fabric preform from layers of material wherein the layers are joined along lines of contact to define axes of the member;

(ii) adjusting the spatial configuration of the layers of the fibrous material to form a desired shape and to define the flanges and the hollow portion;

(iii) placing supports around the layer or layers to assist in maintaining the layers in the desired shape;

(iv) treating the assembly by applying pressure and/or heat to cause the resinous or plastics material to melt and flow around the filaments of the fibrous material to form a structural member; and (v) removing the supports from the structural member.

In a further aspect of the invention the layers constituting the woven fibrous material are stiffened by filling the interstices of the weave with a resinous or plastics material.

In another aspect of the invention the woven fibrous material includes filaments of a thermoplastics material capable of being melt bonded under the influence of heat and pressure to stiffen the woven fibrous material.

The invention thus provides a novel strong, light-weight structural member and in one aspect provides a member with continuous common filamentary interweave between the flanges of the member, thus providing additional resistance to tensile and bending forces tending to pull the structural member apart.

In accordance with the invention, the hollow portion may have any convenient section for example the central portion may have a circular cross-section, or may have any number of sides. In the latter case, the sides of the section may be of the same length or may be different. In a particular embodiment the central portion may have rhombohedral cross-section.

Preferably pairs of adjacent flanges are disposed in spaced parallel relationship.

The cross-section of the structural member may define two pairs of sides, each pair of sides being in spaced parallel relationship.

The structural member my further include eight shute layers of interwoven filaments comprising four pairs of stacked adjacent layers. Where two layers intersect along a surface line or edge of the central portion, each layer may form a separate flange extending outwardly from the central portion or a pair of layers extending from the same line of intersection may be combined into one flange.

Each layer forming the structural member may comprise warp and weft fibres. The warp filaments of each flange may be interwoven preferably in at least four cross-over points with the warp filaments of other layers.

The warp filaments of each flange are interwoven preferably in at least four cross-over points with the warp filaments of other layers.

The warp filaments of each flange may be interwoven with warp filaments of more than one other flange.

The structural member may be further reinforced by additional warp or weft filaments laid onto the member.

The filaments may be formed from fibres of kevlar, carbon, metal, polyamide, polyaramid, polyester, acrylic or polyetheretherketone.

Stiffening of the layers maybe effected in a number of ways well known to one skilled in the art. For example, the fibres of the layers may be of a cross-linkable material in which case activation of the crosslinking will cause stiffening to occur. In another aspect, the fibrous material may be filled with a plastics or resinous material which may be curable.

The fibrous material may include pre-impregnated fibres; these are fibres covered with a coating of or comprising a plastics or resinous material capable of being softened or melted under the influence of heat and pressure. Once the basic shape of the structural member of the invention has been arrived at, the pre-impregnated material may be further coated, or impregnated, or may be treated for example by the application of heat and pressure to effect stiffening.

Alternatively, the filaments may be comingled yarns comprising intermingled fibres for example carbon fibres and suitable thermoplastic fibres. The ratio of the fibres may be approximately 60% carbon fibre to 40% thermoplastic fibres. Once the shape of the member of the invention is arrived at the fibres are treated, for example by heat and pressure, the thermoplastic fibres melt and fill the interstices between the carbon fibres to effect stiffening.

composite structural members may be made from several structural members of the invention by conjoining the members along their flanges. In this way complicated structural elements having a variety of shapes may be made.

In a particular embodiment of the invention, a propellor or impellor may be formed from a structural member according to the present invention by shaping the flanges of the structural member to define suitably shaped blades for the propellor or impellor and then stiffening the propellor or impellor in that shape.

Preferably the layers constituting the structural member are stiffened by filling the interstices of the weave with a resinous or plastics material.

This aspect of the present invention can provide a complex structural member similar to the composite structural member formed from conjoining structural members along their flanges but with improved strength.

The layers of fabric may comprise a multilayer of fabric, interwoven to be capable of three dimensional arrangement to define a central hollow section with flanges.

In a preferred embodiment the step of placing supports includes placing the central hollow section of the interwoven fabric on a mandrel and placing blocks between the flanges to define the shape of structural element required.

In a preferred embodiment both pressure and heat are applied in the treatment stage.

Following is a description of the invention, by way of example only, and with reference to the accompanying drawings, of methods of carrying the invention into effect.

BRIEF DESCRIPTION OF THE DRAWINGS

FIG. 5 is a schematic drawing of the multilayer fabric shown in FIG. 3;

FIG. 6 is a diagram of the multilayer fabric of FIG. 5 opened out to form a double cruciform shape;

FIG. 8 is a diagram of the multilayer fabric shown in FIG. 6, including laid in fabric, in its final form before moulding;

DETAILED DESCRIPTION OF THE PREFERRED EMBODIMENTS

Figure 1:
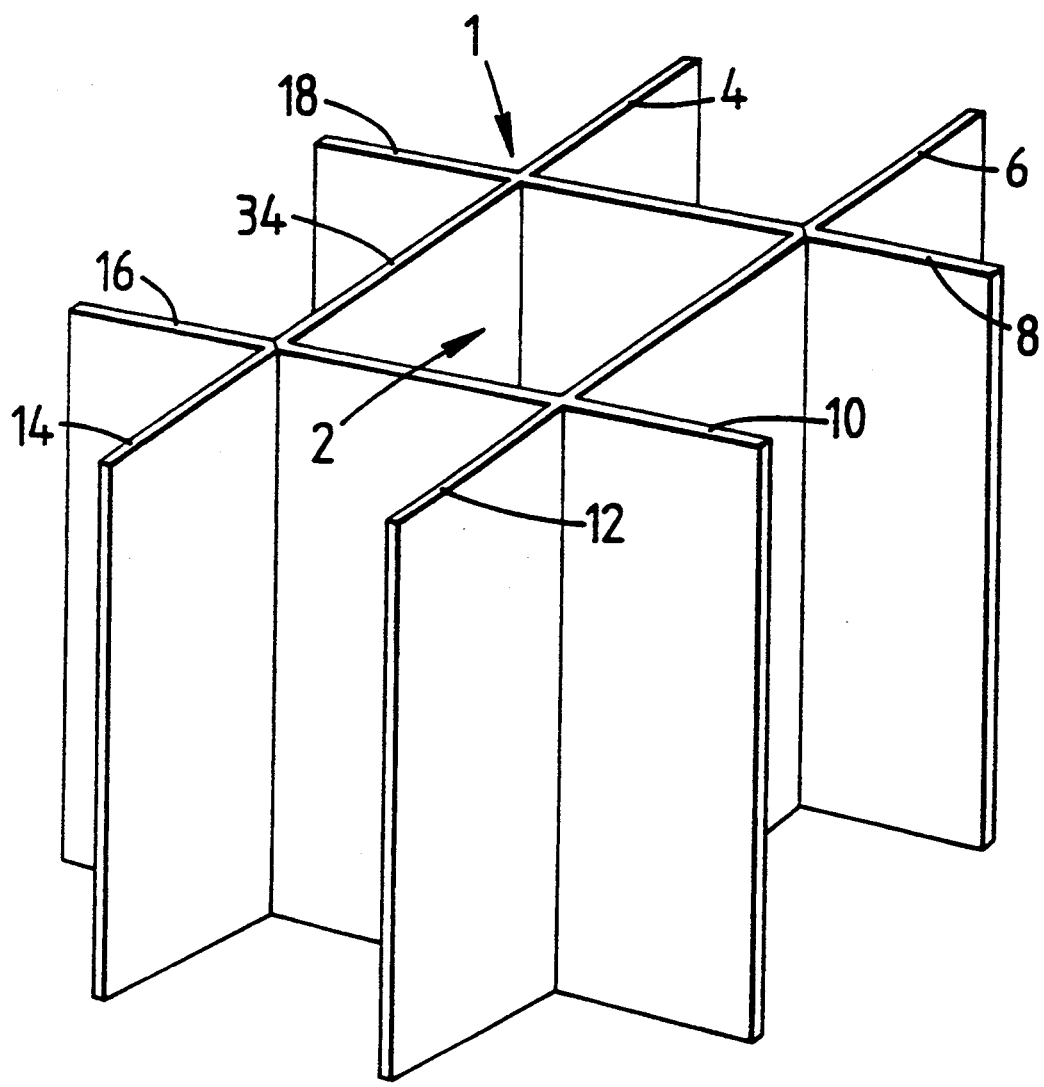
FIG. 1 is a perspective view of a structural member or beam in accordance with the invention.

Referring to the drawings, FIG. 1 shows a structural member 1. The cross-section of the member has a hollow square portion 2, from each corner of which extends two flanges to provide a total of eight flanges 4, 6, 8, 10, 12, 14, 16 and 18 in all spaced around the said central square section 2. The beam has ken formed from a multilayer fabric (layers of interwoven fabric) which for the purposes of this specification will be referred to as a fabric preform.

Figure 3:
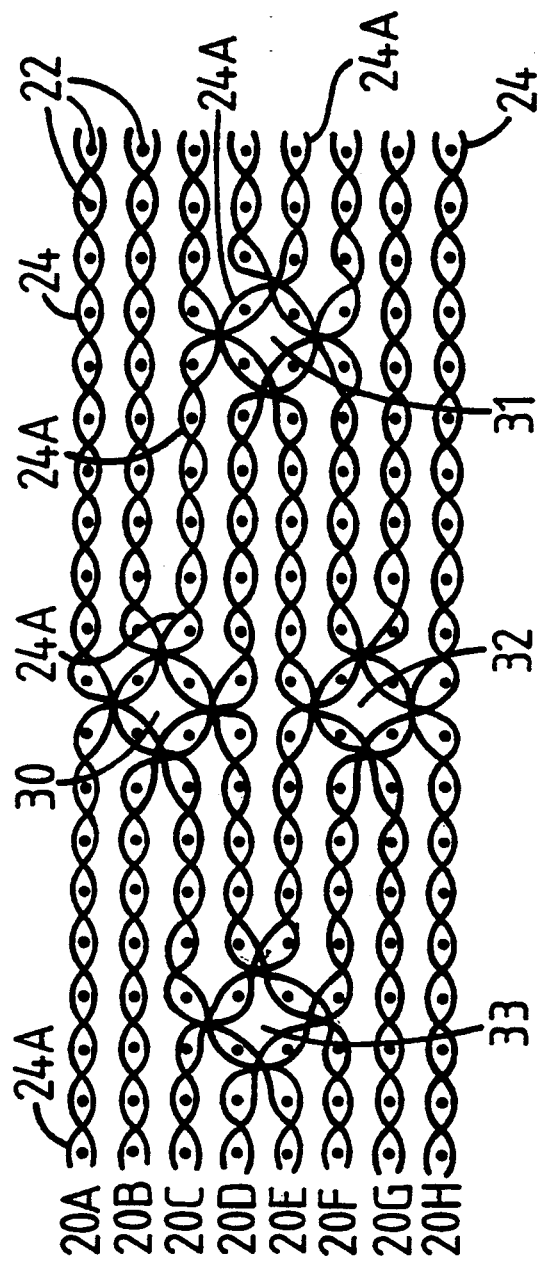
FIG. 3 is a cross-section through a woven multilayer fabric.
Figure 4:
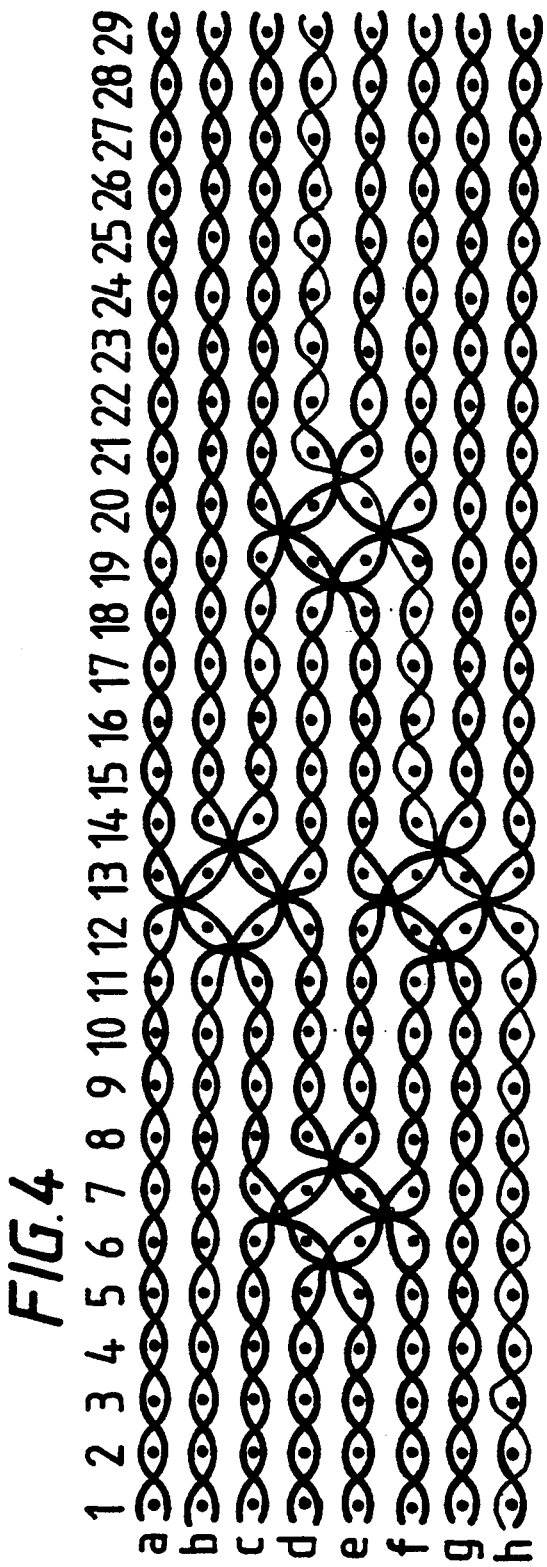
FIG. 4 is a cross section through a similar multilayer fabric woven in a different pattern from that shown in FIG. 3.

Referring to FIG. 3, the fabric preform is composed of eight layers (20 A to H) of warp fibres 22 interwoven with weft fibres 24. A schematic view through the fabric preform is shown in FIG. 5. From FIGS. 3 and 5 it can be seen that there are four interlocking areas 30, 31, 32 and 33 where the woven layers of fabric interlock. The fabric preform illustrated in FIG. 5 can be opened out as shown in FIG. 8 to define the same cross-section that beam 1 defines.

As can be seen from FIG. 3, the basis of the fabric preform is eight layers (20 A to H) of warp fibres 22. Weft or shute fibres 24 are interwoven, in a plain weave pattern, around the warp fibres. As an illustration, if we consider one of the weft fibres labelled 24A we can see that it is woven generally along one layer 20A of warp fibres until it reaches interlocking area, 30. This first pan of the weft fibre in the finished beam forms part of the flange 4 of the beam as seen in FIGS. 1 and 8. After area 30 the fibre 24A passes from the uppermost layer 20A of warp fibres to the third layer 20C of warp fibres. The weft fibre is then woven along layer 20C until it reaches interlocking area 31. The part of the weft fibre forms part of one side 34 of the core section of the beam. After reaching area 31 the fibre passes to the fifth layer 20E of warp fibres. The part of the weft fibre 24A here forms part of flange 14 of the finished beam 1.

Figure 2:
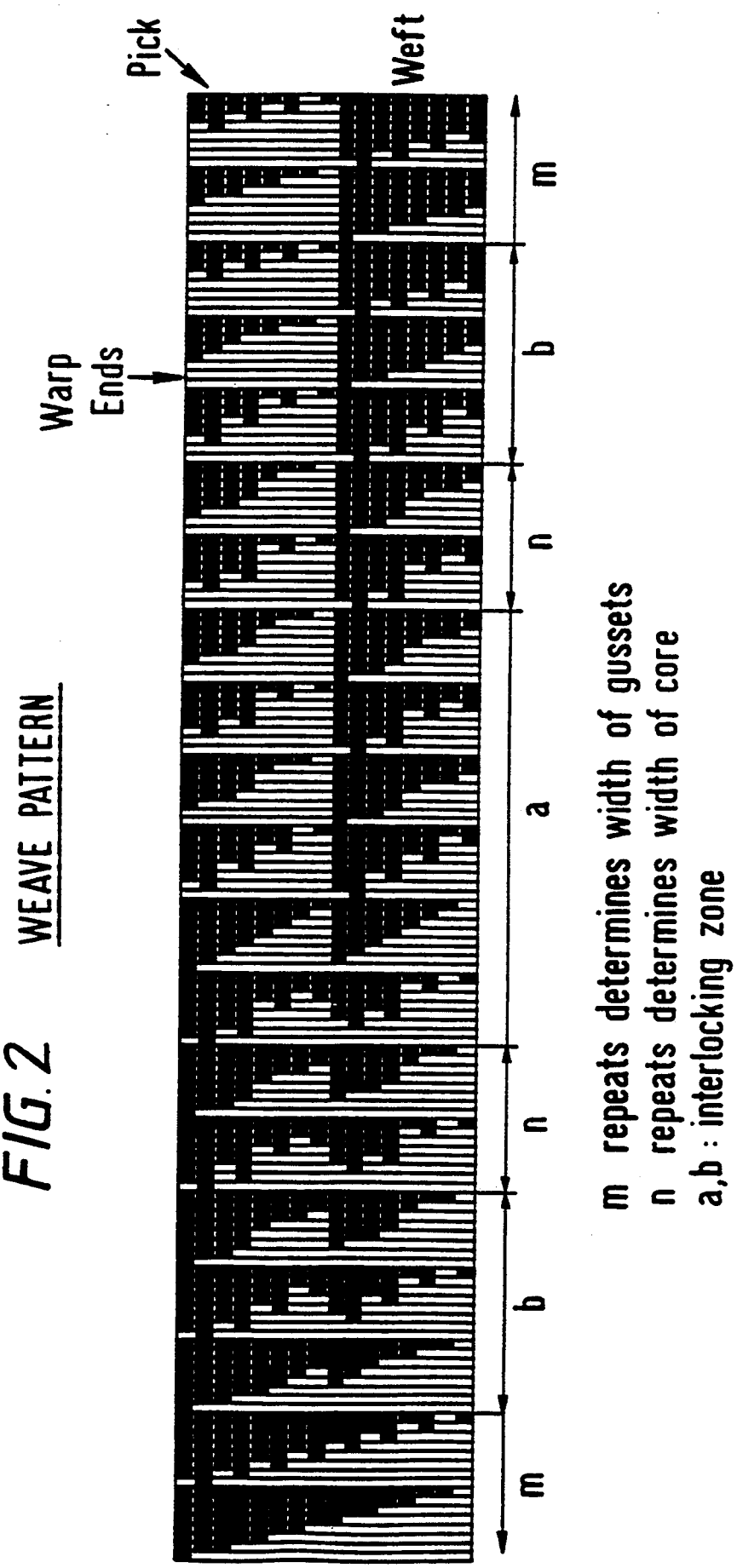
FIG. 2 is a table showing a weave pattern for a multilayer fabric.

A suitable weave pattern for the fabric preform which is woven on a 16 harness loom is illustrated in the table of FIG. 2.

The dimensions of the fabric preform and hence the dimensions of the resultant beam, are determined by the weave pattern. In the table of FIG. 2, a dark area represents one or more weft fibres woven below a warp fibre and a white area represents one or more weft fibres woven above the warp fibre. If the flanges of the beam are of equal size then the length of the plain weave before the first interlocking area or zone (i.e. the number of repeats of m) determines the width of flanges 4 and 18. The number of repeats of n, i.e. the gap between interlocking areas 33 and 30, 32 and 33 determines the width of the hollow section of the fabric preform and hence the width of the hollow section of the resultant beam 1.

The fabric preform is woven from comingled yarn, 60% of which is carbon fibre, and 40% of which is a thermoplastic fibre.

In the embodiment shown in FIG. 8, additional layers of fabric 50 are laid into the fabric preform. The additional layers of fabric are also woven as warp and weft fibres but are laid in so that the warp fibres of the additional layers are at an angle of about 45° to the warp layers of the fibre preform.

Figure 7:
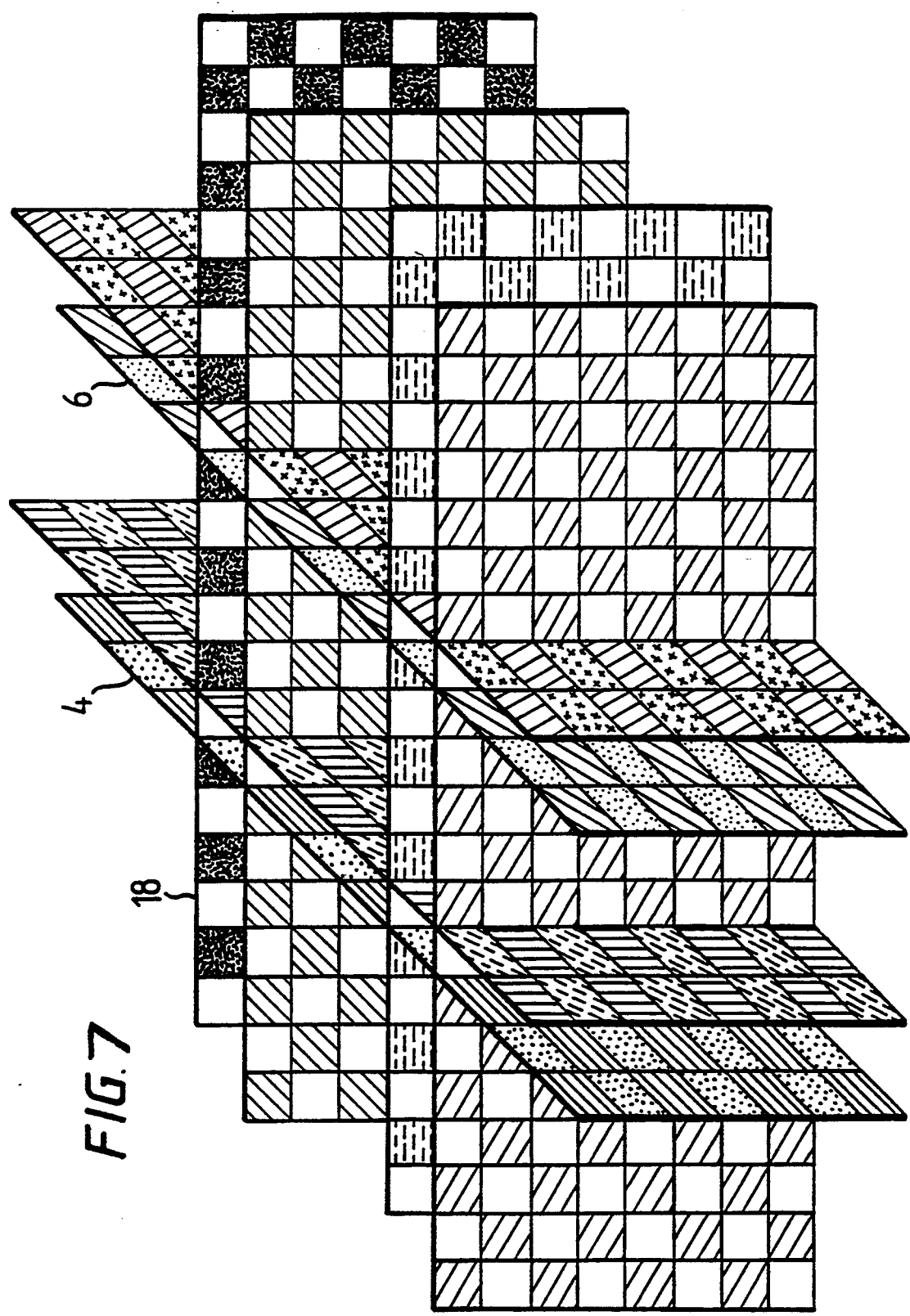
FIG. 7 is a perspective view of the multilayer fabric as shown in FIG. 6.
Figure 9:
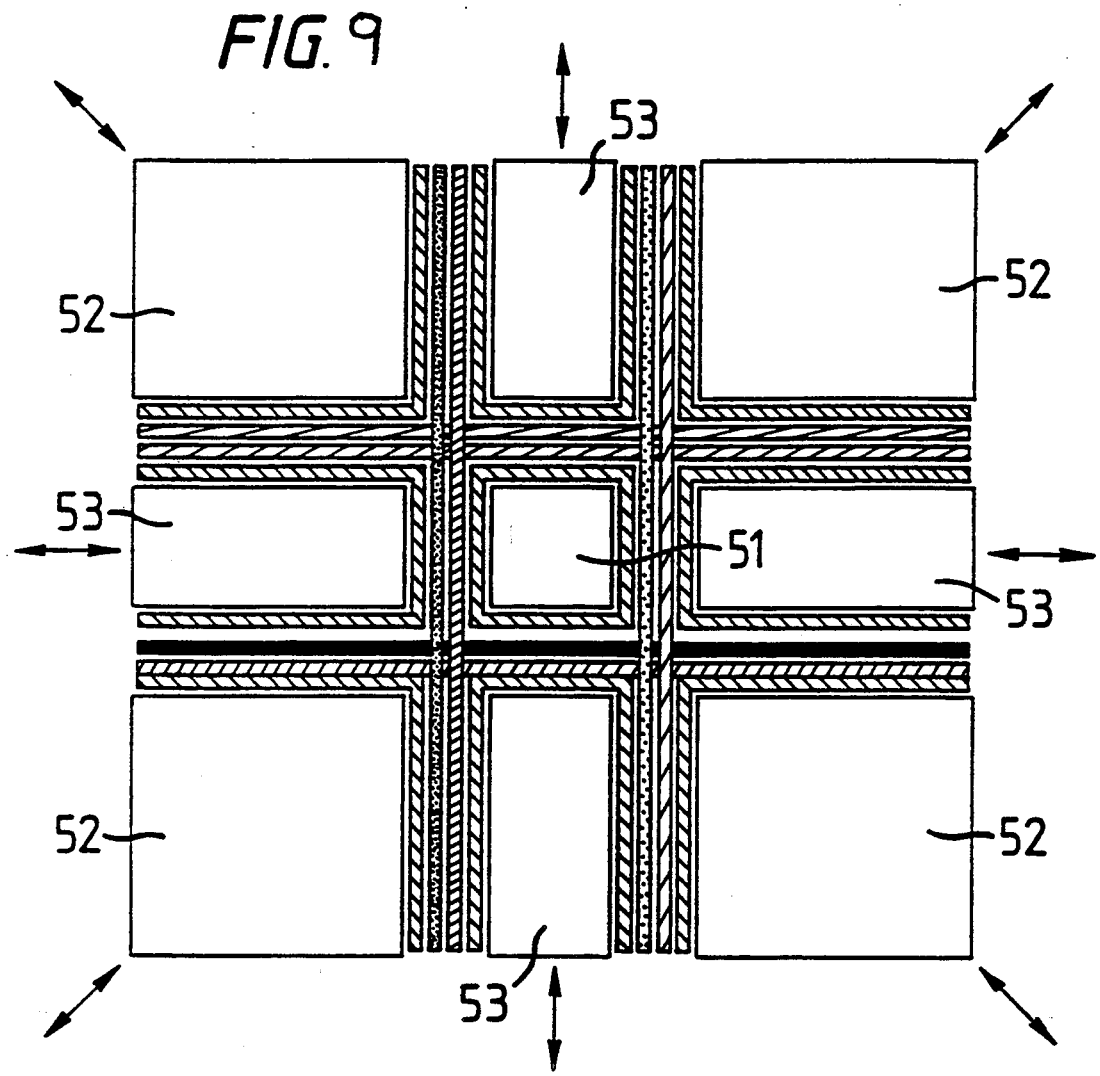
FIG. 9 is a schematic drawing illustrating part of a moulding process.

The woven fabric preform is then cut to form a cruciform shape shown in FIGS. 6 and 7 and the central part of the fabric preform is slid over a mandrel 51, as shown in FIG. 9.

Blocks 52, 53 are then inserted which conform to the desired beam dimensions. The arrows illustrate the direction of movement of the blocks. Corner blocks 52 move diagonally. Blocks 53 between the corner blocks move parallel to the flanges adjacent them.

A vacuum bag is then put around the assembly of the blocks and evacuated so that the blocks are subject to atmospheric pressure to compress the structure and the assembly is subjected to heat.

The thermoplastic resin will melt and flow around the carbon fibre. The thermoplastic resin is allowed to set, the vacuum released and the bag, mandrel and blocks are then removed to leave a double cruciform beam.

Figure 10:
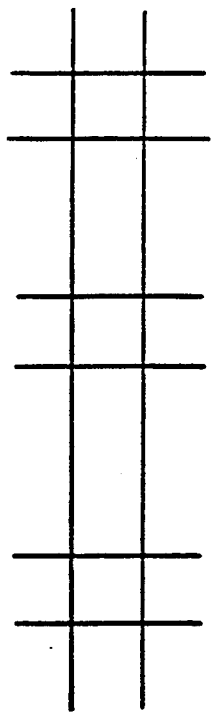
FIGS. 10 illustrate further examples of shapes for and 11 structural elements.
Figure 11:
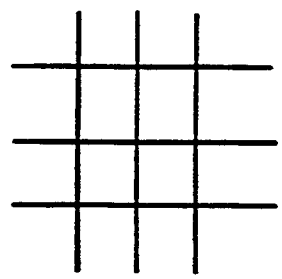

Various other shapes other than a simple double cruciform shape can be made. FIG. 10 shows a series of interwoven double cruciform shapes. An alternative structure is shown in FIG. 11.

The basic double cruciform fabric preform could also be used to make an impellor or propellor, by shaping the fabric preform to define the desired shape for the propellor or impellor, placing shaped supports to maintain the desired shape of the fabric preform placing a vacuum bag around the preform and then treating the fabric preform with heat and pressure.

In this case the central hollow section may be substantially circular.

The application for which the structural member is required and the strength of the fibre/matrix combination of the material member determines the size of the hollow portion of the member. Typically the hollow portion may be an inch square. The provision of flanges enables a series of structural members to be securely conjoined to form large composite structural members.

We claim:

1. A structural member comprising:
    a plurality of layers of interwoven fibrous material, said plurality of layers intersecting and joining each other along lines of contact, said lines of contact forming axes of the member, each said layer including a first layer portion extending between two of said lines of contact and a second layer portion;
    said layers cooperating to open into a three dimensional shape defining the shape of the structural member and including a hollow central portion, said hollow portion having a perimeter defined by said first layer portions and said lines of contact;
    a plurality of points formed on the perimeter of said hollow central portion defined by said lines of contact forming said axes; and
    at least one flange extending outwardly of said hollow central portion at each of said points, said flange being formed by said second layer portions wherein in said three dimensional shape the first and second layer portions of each layer are substantially coplanar.

2. A structural member as claimed in claim 1, wherein the lines of contact are lines of intersection of the plurality of layers in which the filaments of each of the flanges are continuous and are interwoven with said central portion and with an adjacent flange.

3. A structural member as claimed in claim 1, wherein the layers constituting the woven fibrous material have interstices formed in the weave and the material is stiffened by filling the interstices of the weave with a resinous or plastic material.

4. A structural member as claimed in claim 2, wherein the woven fibrous material includes filaments of a thermoplastic material capable of being melt bonded under the influence of heat and pressure to stiffen the woven fibrous material.

5. A structural member as claimed in claim 1, wherein said central portion has a rhombohedral cross-section.

6. A structural member as claimed in claim 3, wherein pairs of adjacent flanges are disposed at said points in spaced parallel relation.

7. A structural member as claimed in claim 3, wherein the cross-section of the structural element defines two pairs of equidistant parallel lines intersecting each other substantially perpendicularly.

8. A structural member as claimed in claim 7, wherein said woven fibrous material is comprised of eight shute layers of filaments interwoven with warp fibers to form four pairs of stacked adjacent layers.

9. A structural member as claimed in claim 3, wherein the structural member is reinforced by providing additional warp or weft filaments placed in juxtaposition with said plurality of layers prior to stiffening.

10. A structural member as claimed in claim 1 wherein each layer of fabric comprises warp and weft fibres.

11. A structural member as claimed in claim 10, wherein the warp filaments of each flange are interwoven in at least four cross-over points with the warp filaments of adjacent layers.

12. A structural member as claimed in claim 11, wherein the warp filaments of each of the flanges are interwoven with warp filaments of more than one other adjacent flange.

13. A structural member, comprising:
    a plurality of layers of woven material interwoven to intersect each other along axes defining lines of intersection of the plurality of layers, wherein the layers are arranged in three dimensions to define a series of spaced hollow portions, each layer being substantially planar;
    each line of intersection of the layers defining a point or a corner of a perimeter of one of the hollow portions; and
    wherein a portion of each layer exterior to an outer part of one of said hollow portions serves to define a part of said structure member selected from a plurality of flanges spaced about the hollow portion and an element of an adjacent hollow portion, whereby filaments of each of the plurality of flanges are continuous and interwoven with at least one of the hollow portions.

14. A structural member as claimed in claim 13, wherein the layers constituting the woven fibrous material have interstices formed in the weave and the material is stiffened by filling the interstices of the weave with a resinous or plastic material.

15. A structural member as claimed in claim 13, wherein the woven fibrous material includes filaments of a thermoplastics material capable of being melt bonded under the influence of heat and pressure to stiffen the woven fibrous material.

16. A structural member as claimed in claim 1 wherein the central portion of the structural member has a substantially rhombohedral cross-section.

17. A propeller or impeller having blades and being formed from a structural member as claimed in claim 1, wherein the flanges of the structural member are joined together to form a shape of the blades for said propeller or impeller and wherein the layers constituting the woven fibrous material are stiffened by filling the interstices of the weave with a resinous or plastic material.

18. The structural member of claim 1 wherein two of said layers are disposed along parallel planes and are adjacent to each other.

19. The structural member of claim 1 wherein said layers have a flat configuration prior to being opened, in said flat configuration, the first layer portion of the layer being at a different level than the second layer portion of said one layer.

* * * * *